(12) United States Patent
Omote et al.

(10) Patent No.: US 7,752,668 B2
(45) Date of Patent: Jul. 6, 2010

(54) NETWORK VIRUS ACTIVITY DETECTING SYSTEM, METHOD, AND PROGRAM, AND STORAGE MEDIUM STORING SAID PROGRAM

(75) Inventors: Kazumasa Omote, Kawasaki (JP);
Masahiko Takenaka, Kawasaki (JP);
Satoru Torii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1124 days.

(21) Appl. No.: 11/041,434

(22) Filed: Jan. 25, 2005

(65) Prior Publication Data

US 2006/0085857 A1    Apr. 20, 2006

(30) Foreign Application Priority Data

Oct. 19, 2004    (JP)    ............................. 2004-304711

(51) Int. Cl.
*G08B 23/00*    (2006.01)
(52) U.S. Cl. ....................................................... 726/24
(58) Field of Classification Search .................... 726/24
See application file for complete search history.

(56) References Cited

U.S. PATENT DOCUMENTS

| | | | | |
|---|---|---|---|---|
| 5,822,517 | A * | 10/1998 | Dotan .......................... | 726/22 |
| 5,867,647 | A * | 2/1999 | Haigh et al. .................. | 726/23 |
| 6,338,141 | B1 * | 1/2002 | Wells ........................... | 726/24 |
| 6,405,318 | B1 * | 6/2002 | Rowland ....................... | 726/22 |
| 6,499,109 | B1 * | 12/2002 | Balasubramaniam et al. | 726/22 |
| 6,560,323 | B2 * | 5/2003 | Gainsboro .................... | 379/188 |
| 6,973,577 | B1 * | 12/2005 | Kouznetsov .................. | 726/25 |
| 7,024,694 | B1 * | 4/2006 | Ko ................................ | 726/23 |
| 7,174,569 | B1 * | 2/2007 | Trostle ......................... | 726/30 |
| 7,216,225 | B2 * | 5/2007 | Haviv et al. .................. | 713/152 |
| 2002/0069370 | A1 * | 6/2002 | Mack ........................... | 713/201 |
| 2002/0099952 | A1 * | 7/2002 | Lambert et al. .............. | 713/200 |
| 2002/0116627 | A1 * | 8/2002 | Tarbotton et al. ............ | 713/200 |
| 2002/0162015 | A1 * | 10/2002 | Tang ............................ | 713/200 |
| 2003/0172109 | A1 * | 9/2003 | Dalton et al. ................ | 709/203 |
| 2004/0078591 | A1 * | 4/2004 | Teixeira et al. .............. | 713/201 |
| 2004/0148524 | A1 * | 7/2004 | Airamo ........................ | 713/201 |
| 2004/0255163 | A1 * | 12/2004 | Swimmer et al. ............ | 713/201 |
| 2005/0182958 | A1 * | 8/2005 | Pham et al. .................. | 713/200 |

(Continued)

OTHER PUBLICATIONS

Windows 2000 (Thomas McGuire, "Windows 2000 Service Tweak guide" Mar. 23, 2000).*

(Continued)

*Primary Examiner*—Kambiz Zand
*Assistant Examiner*—Peter Poltorak
(74) *Attorney, Agent, or Firm*—Staas & Halsey LLP

(57) ABSTRACT

In this system, a monitor unit monitors outbound communications through a network interface. A process designation unit designates a process 2X which has generated communications. A process tree obtaining unit obtains and outputs process tree information for designation of an upper process to the process 2X. A discrimination unit refers to an illegal rule file for definition of an illegal process by a combination of a process and an upper process which have generated communications, and determines whether or not a process 2X is illegal according to communications information, process information, and process tree information. A process stop unit stops a process 2X determined to be illegal. A notification unit notifies a user of the stop of the process 2X.

14 Claims, 14 Drawing Sheets

U.S. PATENT DOCUMENTS

2007/0107052 A1* 5/2007 Cangini et al. ................ 726/22

OTHER PUBLICATIONS

Japanese language Web page of Jupiter Technology, "Virus Worm Remover Tool" disclosed on Internet and English language translation thereof; http:\www.jtc-i.co.jp/avast/avast50-cleaner.htm, Retrieve Date: Sep. 30, 2004.

Hamada, Shigeru, "To Protect a System by Impregnable Defense, Network Security", SunWorld, vol. 12, No. 10, pp. 68-79, Oct. 1, 2002, Japan.

Office Action mailed from the Japanese Patent Patent Office on Mar. 10, 2009 in the corresponding Japanese patent application 2004-304711.

* cited by examiner

FIG.3

| RULE NUMBER | DESTINATION PORT NUMBER TO BE MONITORED | DESTINATION PORT NUMBER USED BY PARENT PROCESS | GRANDPA PROCESS NAME |
|---|---|---|---|
| 1 | 25 | 110/tcp | explorer.exe |
| 2 | 139 | 80/tcp | explorer.exe |
| 3 | 139 | 8080/tcp | explorer.exe |
| .. | .. | .. | .. |

| PROCESS NAME | LATEST TIME | PARENT PROCESS NAME | DESTINATION PORT NUMBER | COMMUNICATIONS DIRECTION |
|---|---|---|---|---|
| edmax.exe | 07:04:16 | explorer.exe | 25/tcp | out |
| edmax.exe | 07:07:16 | explorer.exe | 110/tcp | out |
| iexplore.exe | 07:15:53 | explorer.exe | 80/tcp | out |
| iexplore.exe | 07:16:53 | explorer.exe | 8080/tcp | out |
| iexplore.exe | 07:18:50 | explorer.exe | 443/tcp | out |
| FFFTP.exe | 08:16:44 | explorer.exe | 21/tcp | out |
| spoolsv.exe | 08:40:30 | explorer.exe | 515/tcp | out |
| svchost.exe | 08:50:30 | services.exe | 135/tcp | in |
| .. | .. | .. | .. | .. |

FIG.5

| COMMUNICATIONS TIME | SOURCE PORT NUMBER | DESTINATION PORT NUMBER | PROTOCOL NAME |
|---|---|---|---|
| 10:00:01 | 3133 | 8080 | TCP |
| 10:04:14 | 3134 | 8080 | TCP |
| 10:04:16 | 3230 | 25 | TCP |
| 10:15:53 | 3231 | 25 | TCP |
| 10:16:44 | 3854 | 25 | TCP |
| 11:40:30 | 3232 | 25 | TCP |
| 11:41:01 | 4227 | 139 | TCP |

| COMMUNICA TIONS TIME | PROCESS NAME | PARENT PROCESS NAME | GRANDPA PROCESS NAME | PROCESS NUMBER | SOURCE PORT NUMBER | DESTINATION PORT NUMBER | PROTOCOL NAME |
|---|---|---|---|---|---|---|---|
| 10:00:01 | iexplore.exe | explorer.exe | — | 42 | 3133 | 8080 | TCP |
| 10:04:14 | iexplore.exe | explorer.exe | — | 42 | 3134 | 8080 | TCP |
| 10:04:16 | edmax.exe | explorer.exe | — | 117 | 3230 | 25 | TCP |
| 10:15:53 | edmax.exe | explorer.exe | — | 117 | 3231 | 25 | TCP |
| 10:16:44 | mail23312.exe | edmax.exe | explorer.exe | 336 | 3854 | 25 | TCP |
| 10:40:30 | edmax.exe | explorer.exe | — | 117 | 3232 | 25 | TCP |
| 14:41:01 | cool.exe | iexplore.exe | explorer.exe | 296 | 4227 | 139 | TCP |

FIG.7

| COMMUNI CATIONS TIME | PROCESS NAME | PARENT PROCESS NAME (DESTINATION PORT NUMBER) | GRANDPA PROCESS NAME | PROCESS NUMBER | SOURCE PORT NUMBER | DESTINATI ON PORT NUMBER | PROTOCOL NAME |
|---|---|---|---|---|---|---|---|
| 10:00:01 | iexplore.exe | explorer.exe | — | 42 | 3133 | 8080 | TCP |
| 10:04:14 | iexplore.exe | explorer.exe | — | 42 | 3134 | 8080 | TCP |
| 10:04:16 | edmax.exe | explorer.exe | — | 117 | 3230 | 25 | TCP |
| 10:15:53 | edmax.exe | explorer.exe | — | 117 | 3231 | 25 | TCP |
| 10:16:44 | mail23312.exe | edmax.exe (25, 110) | explorer.exe | 336 | 3854 | 25 | TCP |
| 10:40:30 | edmax.exe | explorer.exe | — | 117 | 3232 | 25 | TCP |
| 14:41:01 | cool.exe | iexplore.exe | explorer.exe | 296 | 4227 | 139 | TCP |

FIG.8

```
DETECTION RESULT
    · OCCURRENCE TIME : 10:16:44
    · PROCESS NAME  : mail23312.exe
    · PARENT PROCESS NAME  : edmax.exe
    · DESTINATION PORT NUMBER  : 25/TCP PROCESS MAIL23312.EXE IS AN ILLEGAL PROCESS
 (MAIL VIRUS).
THEREFORE, MAIL23312.EXE IS STOPPED.
```

FIG.9

| COMMUNICATIONS TIME | PROCESS NAME | PARENT PROCESS NAME (DESTINATION PORT NUMBER) | GRANDPA PROCESS NAME | PROCESS NUMBER | SOURCE PORT NUMBER | DESTINATION PORT NUMBER | PROTOCOL NAME |
|---|---|---|---|---|---|---|---|
| 10:00:01 | iexplore.exe | explorer.exe | — | 42 | 3133 | 8080 | TCP |
| 10:04:14 | iexplore.exe | explorer.exe | — | 42 | 3134 | 8080 | TCP |
| 10:04:16 | edmax.exe | explorer.exe | — | 117 | 3230 | 25 | TCP |
| 10:15:53 | edmax.exe | explorer.exe | explorer.exe | 117 | 3231 | 25 | TCP |
| 10:16:44 | mail23312.exe | edmax.exe | — | 336 | 3854 | 25 | TCP |
| 10:40:30 | edmax.exe | explorer.exe | — | 117 | 3232 | 25 | TCP |
| 14:41:01 | cool.exe | iexplore.exe (80, 8080, 443) | explorer.exe | 296 | 4227 | 139 | TCP |

DETECTION RESULT
 · OCCURRENCE TIME : 14:41:01
 · PROCESS NAME : cool.exe
 · PARENT PROCESS NAME : iexplore.exe
 · DESTINATION PORT NUMBER : 139/TCP PROCESS COOL.EXE IS AN ILLEGAL PROCESS (ACCESS TO SHARED FILE SERVER).
THEREFORE, PROCESS COOL.EXE IS STOPPED.

FIG.13

| RULE NUMBER | DESTINATION PORT NUMBER TO BE MONITORED | DESTINATION PORT NUMBER USED BY PARENT PROCESS | GRANDPA PROCESS NAME |
|---|---|---|---|
| 11 | — | 110/tcp | explorer.exe |
| 12 | — | 80/tcp | explorer.exe |
| 13 | — | 8080/tcp | explorer.exe |
| .. | .. | .. | .. |

18

NETWORK VIRUS ACTIVITY DETECTING SYSTEM, METHOD, AND PROGRAM, AND STORAGE MEDIUM STORING SAID PROGRAM

CROSS-REFERENCE TO RELATED APPLICATIONS

This application claims priority from Japanese patent application serial number 2004-304711 filed on Oct. 19, 2004, the contents of which are herein incorporated by reference.

BACKGROUND OF THE INVENTION

1. Field of the Invention

The present invention relates to a program, a processing method, and a system for detecting a network virus activity to allow a computer to perform a process of detecting and stopping an infection activity when a client PC (computer) which comes under zero-day attack by a network virus performs the infection activity on a network.

To more specifically, the present invention relates to a program, a processing method, and a system for detecting a network virus activity capable of automatically determining whether or not a process is illegal without information for designating a virus such as a signature and stopping an illegal process when a client PC, which comes under zero-day attack by a network virus which is performed by misusing the vulnerability of vulnerability information and a patch program before a vendor publishes them, is performing a process recognized as an infection activity on a network.

2. Description of the Related Art

The conventional technology relating to a network virus activity detecting system are listed below.

(1) Conventional Technology 1

The "Virus Worm Remover Tool" of Jupiter Technology is to: scan the memory of the OS (operating system) of the PC using a signature, which is the information represented by a series of characters, numbers, or the like unique to each virus; stop a corresponding process when a virus is detected so that the growth of the infection of the virus can be suppressed; or stop the communications when the process cannot be stopped (refer to document 1).

<Document 1: Jupiter Technology, "Virus Worm Remover Tool", Internet (URL:http://www.jtc-i.co.jp/avast/avast50-cleaner.htm), retrieved on Sep. 30, 2004>

(2) Conventional Technology 2

The "Symantec Client Security 2.0 (SCS 2.0)" of Symantec is total security strategy software for a client PC having the functions of anti-virus software, a personal firewall, and penetration detection, and detects a virus using a signature, and notifies a user of the presence of a process which has generated new communications.

Since the conventional technology 1 however detects a virus using a signature, it cannot detect or stop the activities of a virus by the zero-day attack. Additionally, there is the problem that a process becomes heavy due to the use of a signature for each virus in a virus detecting process. On the other hand, the conventional technology 2 cannot automatically determine whether or not a process is illegal when the process generates new communications. Therefore, the determination of the validity of a process is up to a user.

SUMMARY OF THE INVENTION

The present invention has been developed to solve the above-mentioned problems, and aims at providing a system, a processing method, and a program for preventing the growth of the infection of a virus by automatically determining the validity of a process performing communications without using a signature for each virus and stopping an illegal process when a client PC which comes under attack of an unknown virus is performing a process recognized as an infection activity on a network.

The present invention is a processing method for detecting an activity of a network virus in the computer connected to a network and comprises the following steps. Further, the present invention is a system including processing units for detecting an activity of a network virus in the computer connected to a network and a program for executing a computer to use a network virus activity detecting method for detecting an activity of a network virus in the computer connected to a network.

The present invention comprises a process designating step of designating a process to be discriminated based on management information for management of a process being operated in the computer, and outputting process tree information for designation of an upper process for the process to be discriminated; and a discriminating step of determining whether or not the process to be discriminated is an illegal process according to discrimination rule information for definition of a behavior common to illegal processes by activities of a virus by a hierarchical relationship between processes and the process tree information.

According to the present invention, discrimination rule information based on the hierarchical relationship among processes is stored to designate common behavior to illegal processes so that it can be determined whether or not a process being operated in a computer is an illegal process by the activities of a virus. Then, for example, according to the management information obtained from the operating system in a computer for management of a process being operated in the computer, a process to be discriminated and one or more upper processes (a parent process, a parent process and a grandpa process, etc.) are designated so that process tree information indicating the relationship among the process to be discriminated and the upper processes can be generated. Then, it is determined according to the process tree information and the discrimination rule information whether or not the process to be discriminated is an illegal process. Practically, when the combination between a process to be discriminated and upper processes is defined in the discrimination rule information, the process to be discriminated is determined to be an illegal process. Thus, it can be determined without using a signature for each virus whether or not a process being operated is an illegal process by the activities of a virus.

Furthermore, with the above-mentioned configuration, the present invention uses the computer to perform a stopping step of stopping the process to be discriminated which has been determined in the discriminating step as an illegal process. Thus, since an illegal process by the activities of a virus can be immediately stopped, the growth of the infection of a virus can be prevented. Additionally, the consumption of the CPU power of a computer by an illegal process can be suppressed.

The present invention further allows the computer to perform a communications cutoff requesting step of outputting a request to cut off communications to be performed by the process to be discriminated which has been determined in the discriminating step to be an illegal process. Thus, in cooperation with the personal firewall provided in a computer and network connection equipment such as an external router, etc., the present invention can cut off illegal network communications by the activities of a virus, and prevent the growth of the infection of a virus.

Furthermore, the present invention allows the computer to perform a notifying step of notifying a user of stopping the process to be discriminated which has been determined in the discriminating step to be an illegal process. Thus, the user can immediately recognize the computer infected with a virus and take necessary action.

The present invention also allows the computer to perform a communications monitoring step of monitoring the outbound communications of the computer, and a process which has generated new communications in the outbound communications is defined as a process to be discriminated in the discriminating step.

Furthermore, the present invention allows the computer to perform a port monitoring step of monitoring the status of a port generated by the process, and a process which has set a predetermined status for the port is defined as a process to be discriminated in the discriminating step. Thus, the activities of a virus which abuses network communications by growth of the infection, leak of internal information, etc. can be efficiently detected by narrowing the processes relating to the communications.

The present invention prescribes and uses the behavior common to viruses as an illegal process discrimination rule and therefore can automatically determine whether or not the communications by a new process are infected by a virus without using a signature for each virus and stop the process when it is infected. The present invention also can automatically determine whether or not the release setting (listen) of a poet by a new process is performed by a virus, and can stop the process when it is infected. Therefore, the present invention can automatically determine and stop an illegal process under zero-day attack by a network virus, thereby preventing the growth of the infection of a virus.

When only the communications of an illegal process are stopped, the consumption of the CPU power due to an illegal process cannot be reduced. However, since the process itself is stopped according to the present invention, the consumption of the CPU power by an illegal process can be reduced.

When a signature is assigned to each virus, all signatures are checked for each occurrence of a communication. However, according to the present invention, it is not necessary to prepare a signature for each virus, and the information about the behavior common to viruses can be stored as an illegal rule file, and the number of rules can be minimized, thereby reducing the processing operation of a system.

BRIEF DESCRIPTION OF THE DRAWINGS

FIG. 3 shows an example of the illegal rule file;

FIG. 4 shows an example of a process log;

FIG. 5 shows an example of a monitor result of outbound communications;

FIG. 6 shows an example of a process designation result;

FIG. 7 shows an example of a discrimination result;

FIG. 8 shows an example of a notification of a detection result;

FIG. 9 shows an example of a discrimination result;

FIG. 10 shows an example of a notification of a detection result;

FIG. 13 shows an example of a monitor result of a listen port; and

DETAILED DESCRIPTION OF THE PREFERRED EMBODIMENTS

Figure 1:
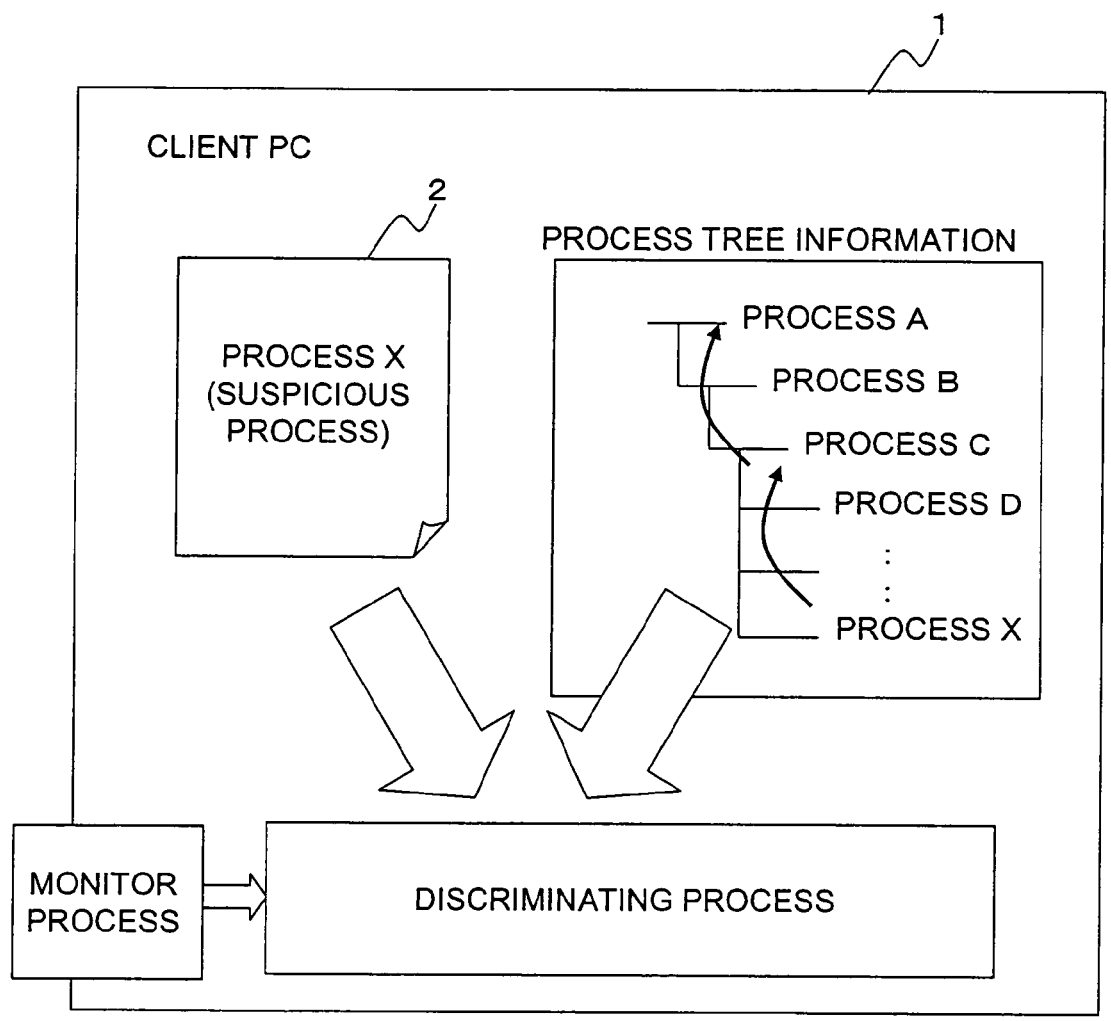
FIG. 1 is an explanatory view showing the principle of the present invention.

FIG. 1 is an explanatory view showing the principle of the present invention. The system according to the present invention sets discrimination rule information indicating several patterns of behaviors common to viruses based on the hierarchical relationship among processes as the rule information for determination as to whether or not a process 2 being operated in a client PC (computer) 1 under zero-day attack (0-day-attack) by a network virus is a suspicious process by the activities of a network virus. For example, as an illegal rule R1, assume the "case in which the closest upper process (parent process) is a process 2S, and a further upper process (grandpa process) is a process 2T". In the monitor process, for example, the external communications (outbound communications) in a network interface is monitored, the process which generates the communications is to be discriminated, and in the discriminating process, a process 2X is designated to be discriminated according to the management information, or the like about the process managed by an operating system (OS) of the client PC 1.

Furthermore, the present system generates process tree information by designating the process 2X, upper processes 2A, 2B, . . . , and it is determined whether or not the process 2X is an illegal process according to the process tree information about the process 2X by referring to a predetermined discrimination rule information. If the upper process (parent process) to the process 2X is the process 2S, and the further upper process (grandpa process) is the process 2T, then the process 2X is determined to be an illegal process. If the parent process of the process 2X is the process 2A, and the grandpa process is the process 2B, then the process 2X is determined to be an authorized process. Furthermore, the present system stops the operation of the process 2X determined to be illegal in the discriminating process, and can notify a user of the stop of the process 2X.

Figure 2:
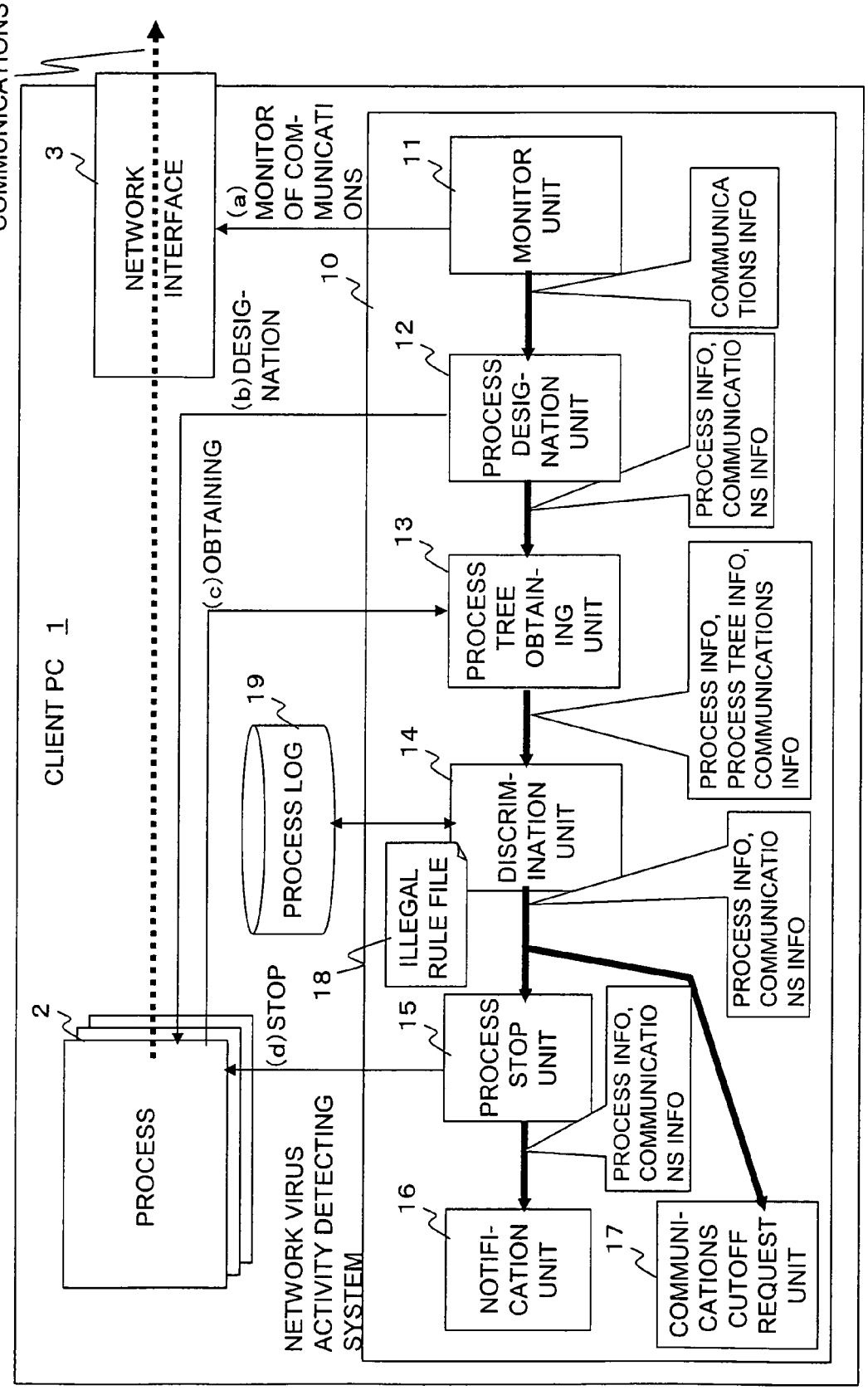
FIG. 2 shows an example of the configuration according to an embodiment of the present invention.

FIG. 2 shows an example of the configuration according to an embodiment of the present invention. A network virus activity detection system 10 is a processing system implemented in the client PC (computer) 1 and detects a suspicious process by the activities of a network virus from the process 2 operating in the client PC 1, and stops the operation. The network virus activity detection system 10 comprises a monitor unit 11, a process designation unit 12, a process tree obtaining unit 13, a discrimination unit 14, a process stop unit 15, a notification unit 16, a communications cutoff request unit 17, an illegal rule file 18, and a process log 19. Each processing means is configured as a program.

The monitor unit 11 is processing means for monitoring the communications of a network interface 3, detecting predetermined communications generated by the process 2, for example, outbound communications from the client PC 1 to external equipment, and outputting communications information which is a detection result. The communications information includes a communications time, a transmission port number, a destination port number, protocol information, and the like. The monitor unit 11 monitors the status of a port, and detects a port for which the process 2 sets a predetermined status, for example, a listen (status in which a port is open for inbound communications) port.

The process designation unit 12 is processing means for designating a process (process to be discriminated 2X) which has generated the status of the detected communications or port according to the communications information obtained from the monitor unit 11 based on, for example, the process management information for management of the process 2 operating in the client PC 1, and outputting process information indicating the process to be discriminated 2X. The process information includes a process name, a process number, and the like for designation of the process to be discriminated 2X.

The process tree obtaining unit 13 is processing means for designating one or more upper processes (parent process, grandpa process, . . . ) 2A, 2B, 2C, . . . to the process to be discriminated 2X according to the process management information, and outputting the process tree information about the hierarchical relationship between the process to be discriminated 2X and the upper processes 2A, 2B, 2C, . . . .

The discrimination unit 14 is processing means for determining whether or not the process to be discriminated 2X is an illegal process using the process tree information and the illegal rule file 18. The illegal rule file 18 is discrimination rule information for determining whether or not the operating process 2 is a suspicious process by the activities of a network virus, and is information about several patterns of behavior common to viruses depending on the hierarchical relationship among processes. The illegal rule file 18 prescribes the behavior common to viruses. Therefore, it is not necessary to prepare rule information for each virus. The discrimination unit 14 designates the destination port number of an upper process based on the process log 19 when the illegal rule file 18 defines the hierarchical relationship between the processes by the combination of a process to be discriminated and the destination port number of an upper process, and determines whether or not the process to be discriminated 2X is an illegal process based on the relationship between the process to be discriminated 2X and the destination port number of the upper process. The discrimination unit 14 stores the information about the process 2 determined to be authorized in the process log 19. The process log 19 is storage means for storing log information recording at least a communications direction, a destination port number, and the name of an upper process to the process 2 for the communications performed by all authorized processes 2 in the client PC 1 in the past.

The discrimination unit 14 uses the process log 19 for designation of the service of the parent process to the process to be discriminated 2X. Normally, since the destination port number corresponds to a used service, the contents of the parent process can be designated by checking the port number on which the communications are performed.

The process stop unit 15 is processing means for stopping the process 2X, which is being activated, according to the process information about the process to be discriminated 2X only when the discrimination unit 14 determines that the process 2X is an illegal process.

The notification unit 16 is processing means for displaying the process information and the stop notification about the stopped process to be discriminated 2X on the display screen of the client PC 1 only when the process to be discriminated 2X is determined to be an illegal process and stopped by the discrimination unit 14.

The communications cutoff request unit 17 is processing means for transmitting a request to cut off communications performed by the process 2X determined to be an illegal process by the discrimination unit 14 to a network connection device, or the like external to the network interface 3 or the client PC 1.

The process performed, when a process which has generated outbound communications is to be determined, is explained below relating to the present invention.

The discrimination unit 14 of the network virus activity detection system 10 comprises the predetermined illegal rule file 18, and the process log 19 storing the log information about the communications by an authorized process.

FIG. 3 shows an example of the illegal rule file 18. For the illegal rule file 18, a rule number, a monitor target destination port number, a use destination port number of a parent process, and a grandpa process name are set for each rule. The monitor target destination port number indicates a destination port number set in the communications generated by the process to be discriminated 2X. The use destination port number of the parent process indicates the destination port number set in the communications generated by the immediately upper process (parent process) that has called the process to be discriminated 2X. The grandpa process name indicates the information designating the immediately upper process (grandpa process) that has called the parent process to the process to be discriminated. For example, the rule number 1 refers to the rule according to which a process is recognized as an illegal process only when the process to be discriminated which has generated communications performs communications (transmitting mail) to the port number 25, and the parent process to this process performed communications on the port number 110 (the parent process is designated as a mail reception program), and the grandpa process has the process name explorer.exe for operating the application.

The rule number 1 refers to the operation status in which, by a user executing an attached mail of the mail received by the parent process (mail reception program) by the double-clicking operation or the like, the process (mail transmission process) is generated and mail is transmitted. The rule numbers 2 and 3 refer to rules according to which a process is recognized as an illegal process only when a process to be discriminated which has generated communications performs communications (access to a file-shared server) on the port number 139, the parent process performed communications on the port number 80 or number 8080 (assuming that the parent process is a Web browsing program), and the grandpa process has the process name explorer.exe for operating an application. Both rule numbers 2 and 3 refer to that, when the parent process (Web browsing program) is browsing a Web page, the process is generated by the parent process downloading an executable program from any Web page and executing it, and the process has accessed, for example, an in-house file-shared server.

FIG. 4 shows an example of the process log 19. The process log 19 records a process name, a latest time, a parent process name, a destination port number, and a communication direction for each communication by an authorized process. The process name indicates the name of a process which has generated communications in the client PC 1. The latest time indicates the latest time at which the communications having the same process name, parent process name, destination port number, and communication direction have been performed.

The parent process name indicates the immediately upper process to the process which has generated communications. The destination port number indicates the port number which is the destination of communications. The communication direction can be "out" (outbound communications indicating external communications) or "in" (inbound communications indicating internal communications).

In the process log 19 shown in FIG. 4, the destination port number whose communication direction is "out" offers the following services.

"25: mail transmission
110: mail reception
80: Web browsing
8080: Web browsing using a proxy
443: Web browsing encrypted by the SSL
21: FTP
515: access to a printer for printing, etc."

When the communication direction is "in", a port is monitored and an illegal process is detected. A destination port number in the communications whose direction is "in", the destination port number is the port number of the destination of the client PC 1, that is the listen port number.

The monitor unit 11 monitors a start packet of the communications from the client PC 1 in the network interface 3 of the client PC 1, and stores the monitor result, as shown in FIG. 5, including the communications time, the source port number, the destination port number, and protocol information (protocol name). The monitor unit 11 passes communications information about the communications start packet to the process designation unit 12 and the process tree obtaining unit 13.

The process designation unit 12 designates the process 2X which has generated the communications according to the process management information managed by the OS of the client PC 1 using the communications information about the monitor unit 11, and passes the process information (process name, process number) relating to the designated process 2X together with the communications information to the discrimination unit 14. According to the process information, the process tree obtaining unit 13 obtains the process tree information by designating the upper process (parent process, grandpa process) to the process to be discriminated 2X based on the process management information, and passes the generated communications information and the process tree information to the discrimination unit 14.

According to the communications information and the process tree information, the discrimination unit 14 holds process designation result (communications time, a source port number, a destination port number, a protocol name, a name and a number of a process to be determined, a parent process name, a grandpa process name) of the process which has generated each communication as shown in FIG. 6. Then, by comparing the process designation result with the process log 19, the contents of the parent process of the process to be discriminated 2X are designated, and it is determined whether or not the process of the process to be discriminated 2X is an illegal process under the service of the parent process and the grandpa process based on the illegal rule file 18.

FIG. 7 shows the discrimination result of the process indicated by the process designation result shown in FIG. 6. Assuming that the process "mail 23312.exe" of the communications generated at the time 10:16:44 is the process to be discriminated 2X, the discrimination unit 14 obtains the destination port number (number 25, number 110) in the past communications of the parent process "edmax.exe" of the process "mail23312.exe" from the process log 19. Then, by referring to the illegal rule file 18 shown in FIG. 3, it is checked whether or not the combination of the destination port number (number 25) of the process "mail23312.exe", the destination port number (number 25, number 110) of the parent process, the grandpa process name (explorer.exe) matches any of the illegal rules. As a result of the check, the combination matches the rule number 1. Therefore, the process "mail23312.exe" is determined to be an illegal process.

Since the discrimination unit 14 determines as the discrimination result shown in FIG. 7 that the process to be discriminated 2X is an illegal process, the discrimination information (the communications information about the communications generated at the time 10:16:44 and the process information about the process "mail23312.exe") about the process to be discriminated 2X (mail23312.exe) is passed to the process stop unit 15 and the communications cutoff request unit 17.

The process stop unit 15 immediately stops the process 2X "mail23312.exe" according to the discrimination information (process information), and passes the discrimination information (the communications information about the communications generated at the time 10:16:44 and the process information about the process "mail23312.exe") about the stopped process 2X to the notification unit 16.

The notification unit 16 displays the detection result as shown in FIG. 8 on the display screen of the client PC 1 according to the discrimination information about the process 2X, and notifies the user that the process "mail23312.exe" has been stopped as an illegal process (mail virus).

FIG. 9 shows the discrimination result about another process than the process designation result shown in FIG. 6. Assuming that the process "cool.exe" of the communications generated at the time 14:41:01 is the process to be discriminated 2X, the discrimination unit 14 obtains the destination port number (number 80, number 8080, number 443) in the past communications of the parent process "iexplore.exe" of the process "cool.exe" from the process log 19. Then, by referring to the illegal rule file 18 shown in FIG. 3, it is checked whether or not the combination of the destination port number (number 139) of the process "cool.exe", the destination port number (number 80, number 8080, number 443) of the parent process, and the grandpa process name (explorer.exe) matches any of the illegal rules. Since the combination matches the rule numbers 2 and 3, the process "cool.exe" is determined to be an illegal process.

Since the discrimination unit 14 determines in the process discrimination result shown in FIG. 9 that the process to be discriminated 2X is an illegal process, the discrimination information about the process to be discriminated 2X (cool.exe) is passed to the process stop unit 15. If the discrimination unit 14 determines that the process 2 to be determined is not an illegal process, predetermined log information (process name, latest time of communications time, parent process name, destination port number, communication direction) is accumulated in the process log 19 according to the communications information about the process 2 and the process tree information. When the log information having the same process name, parent process name, destination port number, and communication direction has already been accumulated in the process log 19, the latest time of the log information is updated to the communications time of the communications information about the process 2X.

Then, the process stop unit 15 immediately stops the process 2X "cool.exe" according to the discrimination information (process information), and passes the discrimination information about the stopped process 2X to the notification unit 16. The notification unit 16 displays the detection result shown in FIG. 10 on the display screen of the client PC 1, and notifies the user that the process "cool.exe" has been stopped as an illegal process (access to a shared file server).

Figure 11:
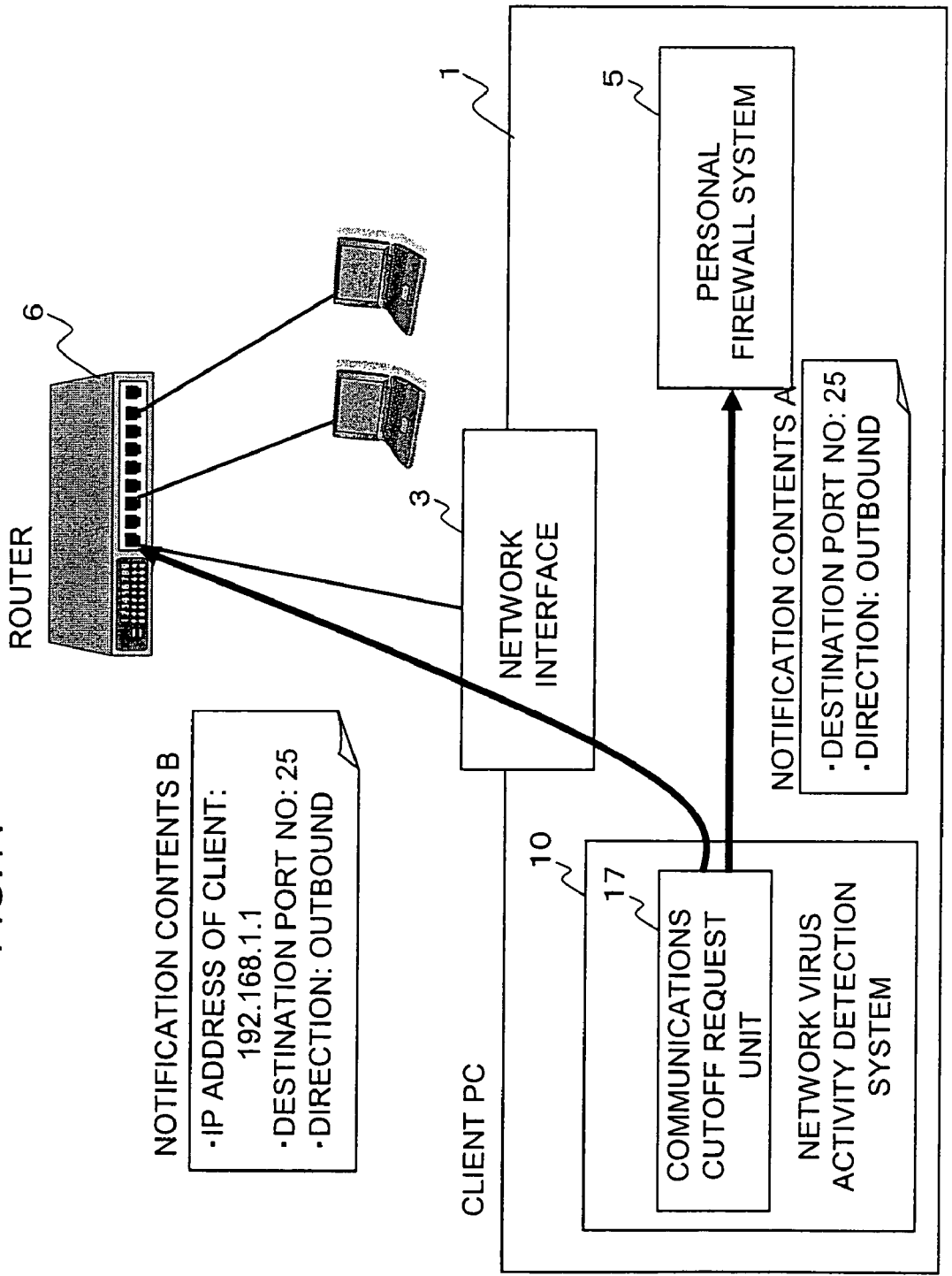
FIG. 11 is an explanatory view of the output of a request to cut off communications.

Furthermore, according to the discrimination information (the communications information about the communications generated at the time 10:16:44 and the process information about the process "mail23312.exe") about the process 2X, the communications cutoff request unit 17 passes the notification contents a (destination port number 25, communication direction: out (outbound communications)) indicating the request to cut off communications to a personal firewall system 5 provided in the client PC 1 as shown in FIG. 11 to cut off the outbound communications generated by the process "mail23312.exe". The personal firewall system 5 cuts off the outbound communications to a destination port number 25 according to the notification contents a from the communications cutoff request unit 17. The communications cutoff request unit 17 transmits the notification contents b (IP address (192.168.1.1) of the client PC 1, the destination port number 25, and the communication direction: out (outbound communications)) indicating the request to cut off communications to a router 6 connected to the client PC 1 through the network interface 3. The router 6 cuts off the outbound communications from the IP address (192.168.1.1) to the destination port number 25 according to the notification contents a from the communications cutoff request unit 17.

Figure 12:
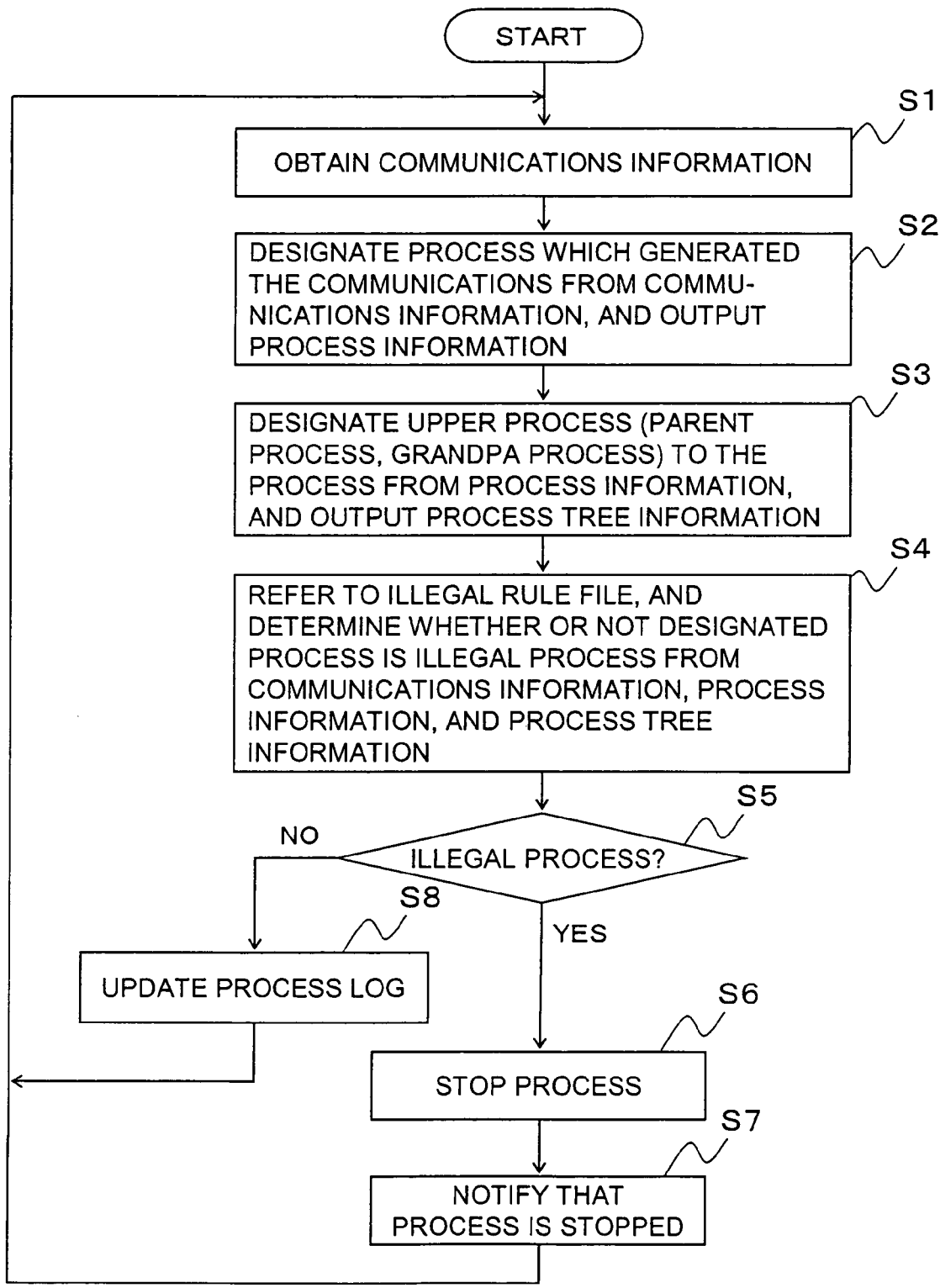
FIG. 12 shows a flow of the process performed when a process which has generated outbound communications is to be discriminated.

FIG. 12 shows a flow of the process performed when a process which has generated outbound communications is to be discriminated. The monitor unit 11 of the network virus activity detection system 10 obtains the communications information about the network interface 3 (step S1). The process designation unit 12 refers to the process management information, designates according to the communications information the process 2X which has generated the communications, and outputs the process information about the process 2X (step S2). According to the process information, the process tree obtaining unit 13 designates the upper process (parent process, grandpa process) to the process 2X, and outputs process tree information (step S3). Then, the discrimination unit 14 refers to the illegal rule file 18, and determines whether or not the process 2X is an illegal process according to the communications information, process information, and process tree information (step S4). If the process 2X is an illegal process (YES in step S5), the process stop unit 15 stops the process 2X (step S6), and the notification unit 16 issues a notification of the stop of the process 2X (step S7). On the other hand, unless the process 2X is an illegal process (NO in step S5), the discrimination unit 14 updates the process log 19 according to the log information about the process 2X (step S8).

The process performed when a process which has generated a listen port is to be determined is explained below relating to the present invention.

The discrimination unit 14 of the network virus activity detection system 10 sets the illegal rule file 18 as shown in FIG. 13. The rule number 11 of the illegal rule file 18 shown in FIG. 13 is a rule according to which a process is recognized as an illegal process when the process makes a port (any port) listen and sets it in an open status, the parent process to this process performed communications on the port number 110 (the parent process is designated as a mail reception program), and the grandpa process has the process name explorer.exe for operating the application.

The rule number 11 prescribes the operation status as an illegal status when a process is generated and a port is made to listen by the parent process (mail reception program) by the execution of a user by the double-clicking operation or the like.

Furthermore, the rule numbers 12 and 13 refer to rules according to which a process is recognized as an illegal process only when a process makes a port listen, the parent process performed communications on the port number 80 or number 8080 (assuming that the parent process is a Web browsing program), and the grandpa process has the process name explorer.exe for operating an application. Both rule numbers 12 and 13 refer to an illegal operation status when a process is generated by a parent process downloading from any Web page and executing an executable program, and the process makes a port listen.

The monitor unit 11 of the network virus activity detection system 10 monitors a port newly opened (listened) in the client PC 1, and stores a port monitor result including a time at which the listening is set, a port number, and protocol information (protocol name). Then, the monitor unit 11 passes the port monitor result to the process designation unit 12 and the process tree obtaining unit 13.

The process designation unit 12 designates the process 2Y which listens to the port according to the process management information managed by the OS of the client PC 1 based on the port monitor result of the monitor unit 11, and passes the process information (process name, process number) relating to the designated process 2Y together with the port monitor result. Then, the process tree obtaining unit 13 obtains process tree information (relationship with a process to be discriminated, a process name of each upper process) by designating upper processes (parent process, grandpa process) to the process to be discriminated 2Y from the process management information according to the process information, and passes the port monitor result and the process tree information to the discrimination unit 14.

According to the port monitor result and the process tree information, the discrimination unit 14 holds the process designation result (set time, port number (destination port number), protocol name, name of process to be discriminated, parent process name, grandpa process name) of the process which has listened a port. By comparison with the log information whose communication direction of the process log 19 is "in", the contents of the parent process of the process to be discriminated 2Y are designated, and it is determined according to the illegal rule file 18 whether or not the process of the process to be discriminated 2Y is an illegal process under the service of the parent process and the grandpa process. When it is determined that the process to be discriminated 2Y is an illegal process, the discrimination information about the process to be discriminated 2Y is passed to the process stop unit 15. Then, according to the discrimination information (process information), the process stop unit 15 immediately stops the process 2Y, and passes the discrimination information about the stopped process 2Y to the notification unit 16. The notification unit 16 displays a detection result that the process 2Y is an illegal process which has performed port listen from the process discrimination result of the process 2Y on the display screen of the client PC 1, and notifies the user of the stop of the process 2Y.

Figure 14:
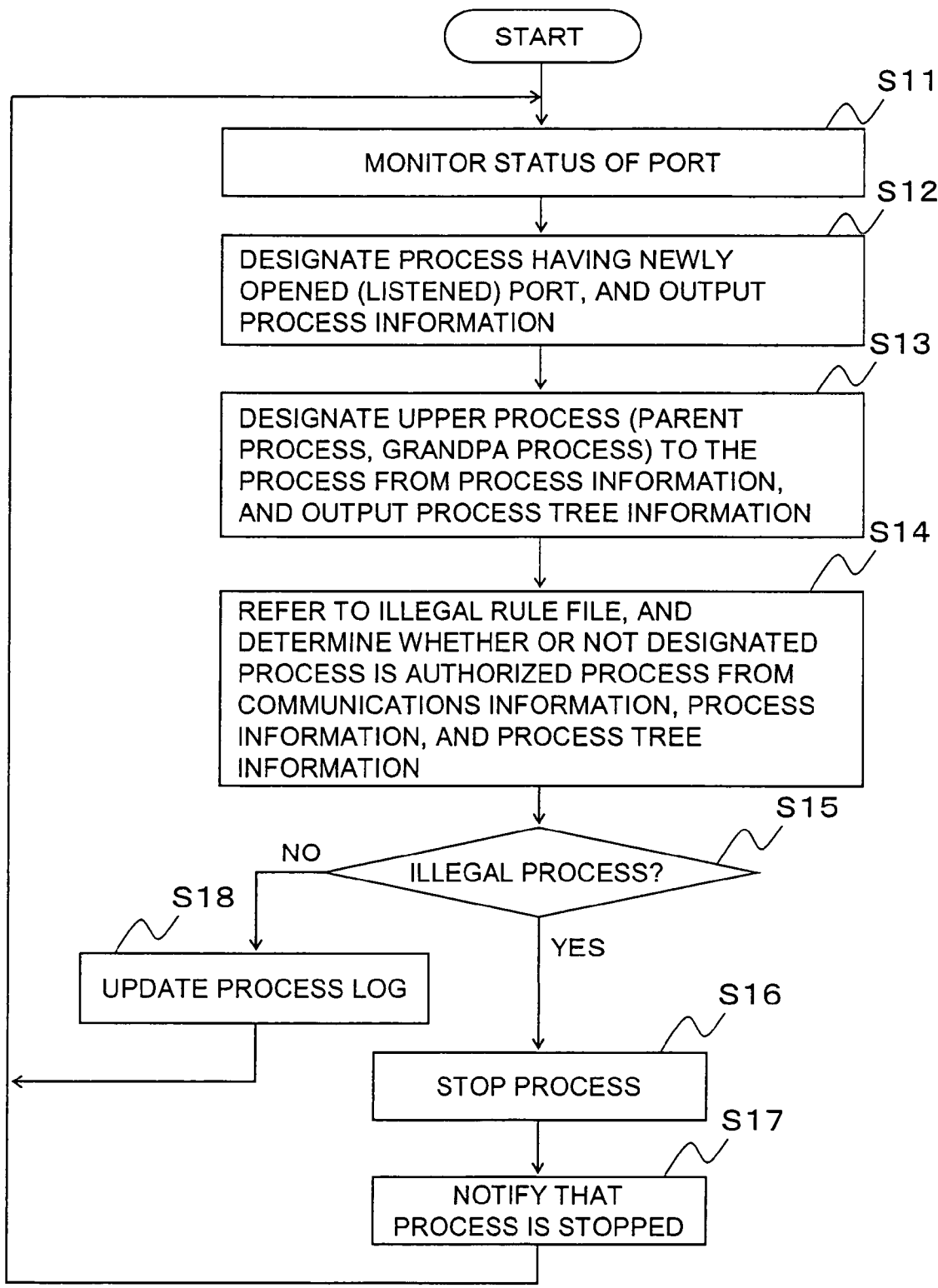
FIG. 14 shows a flow of the process when a process which has generated a listen port is to be discriminated.

FIG. 14 shows a flow of the process performed when a process which has generated a listen port is to be discriminated. The monitor unit 11 of the network virus activity detection system 10 monitors ports of the client PC 1 (step S11), and the process designation unit 12 designates the process 2Y which has newly opened (listened) a port, and outputs process information about the process 2X (step S12). The process tree obtaining unit 13 designates upper processes (parent process, grandpa process) to the process 2Y according to the process information, and outputs the process tree information (step S13). Then, the discrimination unit 14 refers to the illegal rule file 18, and determines whether or not the process 2Y is an illegal process according to the communications information, process information, and process tree information (step S14). If the process 2Y is an illegal process (YES in step S15), then the process stop unit 15 stops the process 2Y (step S16), and the notification unit 16 notifies that the process 2Y has stopped (step S17). On the other hand, is the process 2Y is not an illegal process (NO in step S15), the discrimination unit 14 updates the process log 19 according to the log information about the process 2Y (step S18).

The present invention is explained above by referring to the embodiments, but it is obvious that a number of variations can be applied within the scope of the gist of the present invention. The element, processing means, etc. have been explained as programs to be read and executed by a computer, but the programs embodying the present invention can be stored in an appropriate computer-readable record medium such as mobile medium memory, semiconductor memory, a hard disk, etc., and can be provided by recording on these record media, or provided over network communications through a communications interface.

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A network virus activity detecting system for detecting activities of a network virus in a computer connected to a network, comprising:
    a discrimination rule storage unit that stores discrimination rule information in which behavior common to fraudulent processes performed by activities of a virus is defined using a hierarchical relationship between processes;
    an information storage unit that stores management information of processes being operated in the computer and history information including behavior that the processes have performed;
    a processor configured as a communications monitor unit that monitors communications of the computer, outputs communications information based on a result of the monitoring, and defines a process that has generated new communications as a process to be discriminated;
    a processor configured as a process designation unit that designates a process to be discriminated and one or more upper processes thereof to the process to be discriminated according to the management information, and creates tree information indicating a relationship between the process to be discriminated and the upper process; and
    a processor configured as a discrimination unit that determines that the process to be discriminated is a fraudulent process when a behavior performed in a communications process by an upper process corresponds to a behavior defined in the discrimination rule information according to the process tree information, the history information, and the discrimination rule information.

2. The network virus activity detecting system according to claim 1, further comprising:
    a stopping unit that stops the process to be discriminated that has been determined by the discrimination unit as a fraudulent process.

3. The network virus activity detecting system according to claim 1, further comprising:
    a communications cutoff request unit that outputs a request to cut off communications to be performed by the process to be discriminated that has been determined by the discrimination unit to be a fraudulent process.

4. The network virus activity detecting system according to claim 1, further comprising:
    a log obtaining unit that accumulates log information that relates to communications performed by an authorized process and records at least a communication direction, a destination port number, and an upper process to the process, wherein
    when the discrimination rule information defines a fraudulent process by a combination of a process to be discriminated and a destination port number of an upper process, the destination port number of the upper process is designated according to the log information, and the discrimination unit determines whether the process to be discriminated is a fraudulent process by the relationship of the process to be determined and the destination port number of the upper process.

5. A network virus activity detecting method for detecting activities of a network virus in a computer connected to a network, comprising:
    obtaining management information of processes being operated in the computer and history information including behavior that the processes have performed;
    monitoring communications of the computer, outputting communications information based on a result of the monitoring, and defining a process that has generated new communications as a process to be discriminated;
    designating a process to be discriminated based on the management information;
    creating process tree information for designation of an upper process for the process to be discriminated based on the management information; and
    determining that the process to be discriminated is a fraudulent process when a behavior performed in a communications process by the upper process corresponds to a behavior defined in discrimination rule information in which behavior common to fraudulent processes by activities of a virus using a hierarchical relationship between processes, the process tree information, and history information.

6. The network virus activity detecting method according to claim 5, further comprising:
    stopping the process to be discriminated that has been determined in the discriminating as a fraudulent process.

7. The network virus activity detecting method according to claim 5, further comprising:
    outputting a request to cut off communications to be performed by the process to be discriminated that has been determined in the discriminating to be a fraudulent process.

8. The network virus activity detecting method according to claim 5, further comprising:
    accumulating log information that relates to communications performed by an authorized process and records at least a communication direction, a destination port number, and an upper process to the process, wherein
    when the discrimination rule information defines a fraudulent process by a combination of a process to be discriminated and a destination port number of an upper process, the destination port number of the upper process is designated according to the log information, and it is determined in the discriminating whether the process to be discriminated is a fraudulent process.

9. A non-transitory computer-readable storage medium encoded with a computer program for detecting activities of a network virus in a computer connected to a network, the program when executed by a computer causes the computer to perform a method comprising:

storing discrimination rule information in which behavior common to fraudulent processes performed by activities of a virus is defined using a hierarchical relationship between processes;

storing management information of processes being operated in the computer and history information including behavior that the processes have performed;

monitoring communications of the computer, outputting communications information based on a result of the monitoring, and defining a process that has generated new communications as a process to be discriminated;

designating a process to be discriminated and one or more upper processes to the process to be discriminated according to the management information, and creating tree information indicating a relationship between the process to be discriminated and the upper process; and determining that the process to be discriminated is a fraudulent process when a behavior performed in a communications process by an upper process corresponds to a behavior defined in the discrimination rule information according to the process tree information, the history information, and the discrimination rule information.

10. The non-transitory computer-readable storage medium according to claim 9, wherein the program causes the computer to further perform:

stopping the process to be discriminated that has been determined as a fraudulent process.

11. The non-transitory computer-readable storage medium according to claim 9, wherein the program causes the computer to further perform:

outputting a request to cut off communications to be performed by the process to be discriminated that has been determined to be a fraudulent process.

12. The non-transitory computer-readable storage medium according to claim 9, wherein the program causes the computer to further perform:

accumulating log information that relates to communications performed by an authorized process and records at least a communication direction, a destination port number, and an upper process to the process, wherein when the discrimination rule information defines a fraudulent process by a combination of a process to be discriminated and a destination port number of an upper process, the destination port number of the upper process is designated according to the log information, and it is determined whether the process to be discriminated is a fraudulent process by the relationship of the process to be determined and the destination port number of the upper process.

13. A network virus activity detecting method for detecting activities of a network virus in a computer connected to a network, comprising:

obtaining management information of processes being operated in the computer and history information including behavior that the processes have performed;

designating a process to be discriminated based on the management information;

creating process tree information for designation of an upper process for the process to be discriminated based on the management information;

determining whether the process to be discriminated is a fraudulent process according to discrimination rule information in which behavior common to fraudulent processes by activities of a virus using a hierarchical relationship between processes, the process tree information, and history information;

monitoring the outbound communications of the computer, wherein a process that has generated new communications in the outbound communications is defined as a process to be discriminated in the discriminating; and accumulating log information that relates to communications performed by an authorized process and records at least a communication direction, a destination port number, and an upper process to the process, wherein when the discrimination rule information defines a fraudulent process by a combination of a process to be discriminated and a destination port number of an upper process, the destination port number of the upper process is designated according to the log information, and it is determined in the discriminating whether the process to be discriminated is a fraudulent process.

14. A non-transitory computer-readable storage medium encoded with a computer program for detecting activities of a network virus in a computer connected to a network, the program when executed by a computer causes the computer to perform a method comprising:

storing discrimination rule information in which behavior common to fraudulent processes performed by activities of a virus is defined using a hierarchical relationship between processes;

storing management information of processes being operated in the computer and history information including behavior that the processes have performed;

designating a process to be discriminated and one or more upper processes to the process to be discriminated according to the management information, and creating tree information indicating a relationship between the process to be discriminated and the upper process;

determining whether the process to be discriminated is a fraudulent process according to the process tree information, the history information, and the discrimination rule information;

monitoring the outbound communications of the computer, wherein a process that has generated new communications in the outbound communications is defined as a process to be discriminated; and accumulating log information that relates to communications performed by an authorized process and records at least a communication direction, a destination port number, and an upper process to the process, wherein when the discrimination rule information defines a fraudulent process by a combination of a process to be discriminated and a destination port number of an upper process, the destination port number of the upper process is designated according to the log information, and it is determined whether the process to be discriminated is a fraudulent process by the relationship of the process to be determined and the destination port number of the upper process.

* * * * *